United States Patent

[11] 3,579,270

[72] Inventors: Norman Richard Daly, Reading; Royal Edward Powell, Newbury, England
[21] Appl. No.: 769,644
[22] Filed: Oct. 22, 1968
[45] Patented: May 18, 1971
[73] Assignee: United Kingdom Atomic Energy Authority, London, England
[32] Priority: Oct. 31, 1967
[33] Great Britain
[31] 49529/67

[54] ENERGY SELECTIVE ION BEAM INTENSITY MEASURING APPARATUS AND METHOD UTILIZING A SCINTILLATOR TO DETECT ELECTRONS GENERATED BY THE BEAM
13 Claims, 7 Drawing Figs.

[52] U.S. Cl. ............................................. 250/41.9, 250/71.5
[51] Int. Cl. ............................................. G01t 1/20, B01d 59/44
[50] Field of Search ............................ 250/41.9 (R), 49.59

[56] References Cited
UNITED STATES PATENTS
3,041,453  6/1962  Daly ........................... 250/41.9R FOREIGN PATENTS
1,078,823  8/1967  Great Britain ............... 250/49.5(9)

Primary Examiner—James W. Lawrence
Assistant Examiner—C. E. Church
Attorney—Larson, Taylor and Hinds ABSTRACT: The apparatus is primarily intended for use with ion beams from mass spectrometers, and has one application in determining metastable ion spectra. It comprises a retarding electrode carrying a scintillator detector and preceded by an apertured electrode. When the retarding electrode voltage equals or exceeds the source accelerating voltage, all ions are repelled to the apertured electrode where secondary electrons are produced which are accelerated to the scintillator and an output is obtained from a photomultiplier located beyond the retarding electrode. When the retarding electrode voltage is less than the source accelerating voltage only ions resulting from metastable fragmentations (which have less energy) are so repelled. The parent ions strike the scintillator but produce no output because the latter is coated with an ion-opaque layer. A second, apertured, retarding electrode can precede the above-described arrangement, to which a lower voltage is applied, thus setting a lower as well as an upper limit to the ion energy detected and making the apparatus of more general application as an energy range selector.

ENERGY SELECTIVE ION BEAM INTENSITY MEASURING APPARATUS AND METHOD UTILIZING A SCINTILLATOR TO DETECT ELECTRONS GENERATED BY THE BEAM

BACKGROUND OF THE INVENTION

This invention relates to ion beam intensity measuring apparatus and methods suitable for mass spectrometers and has one application in measuring the metastable fragment ion content of such a beam. More generally, the present invention enables ions below a predetermined energy to be selected for detection, and in one form enables ions within a predetermined energy range be selected for detection.

In the mass spectrometry of organic molecules, the ions formed in the ion source consist of ions of the parent molecule, together with fragment ions formed from parent molecules which are fragmented in the ionizing process; the fragment ions formed in ionizing a given organic molecule can have numerous different chemical compositions.

Some of the parent and fragment ions formed at the source are metastable, and fragment spontaneously during the flight of the ions between the ion source and the ion beam intensity measuring system. The ionized products of such spontaneous fragmentations are herein termed metastable fragment ions.

Considerable information about the structure of the parent molecule can be obtained by examining the metastable fragment ion spectrum, but hitherto it has been difficult to separate out the metastable fragment ion content from the other ions in the spectrum.

It is one object of the present invention to provide apparatus which enables the metastable fragment ion content to be determined more readily than heretofore.

SUMMARY OF THE INVENTION

According to the present invention ion beam intensity measuring apparatus suitable for use with a mass spectrometer comprises a first apertured electrode for admitting the ion beam, a first retarding electrode located beyond said first apertured electrode to apply a retarding electric field to ions passing through the aperture, a detector for detecting secondary electrons emitted from said first apertured electrode by ions repelled to said first apertured electrode by said field, and a connection for applying a variable potential to said first retarding electrode.

Said secondary electron detector may be mounted on said first retarding electrode facing said first apertured electrode. The surface of said second electron detector facing said first apertured electrode may include a coating, which may be metallic, which is substantially opaque to said ions but substantially transparent to said secondary electrons. Said detector may be a translucent scintillator and form the central portion of said first retarding electrode. The photocathode of a photomultiplier tube may be located beyond said first retarding electrode opposite that surface of said scintillator which faces away from said first apertured electrode.

Said first apertured electrode may be preceded by a second retarding electrode having an aperture and having a connection for applying thereto a variable potential less than the potential applied to said first retarding electrode. Said second retarding electrode may include a grid.

Said first apertured electrode may be preceded by a second apertured electrode arranged to be held at the same potential as said first apertured electrode, an apertured electron-suppression electrode being located between said first and second apertured electrodes.

Said first apertured electrode may be preceded by a second apertured electrode arranged to be held at the same potential as said first apertured electrode, an apertured electron-suppression electrode being located between said first and second apertured electrodes, said second retarding electrode preceding said second apertured electrode, and a third apertured electrode preceding said second retarding electrode and arranged to be held at the same potential as said first and second apertured electrodes.

The first retarding electrode and the first apertured electrode as preferably substantially parallel to one another.

Also according to the present invention a method of measuring a metastable fragment ion spectrum with a mass spectrometer comprises using an apertured electrode to admit the ion beam, a retarding electrode located beyond the apertured electrode to apply a retarding electric field to ions passing through the aperture, a detector mounted on said retarding electrode to detect secondary electrons emitted from said apertured electrode by ions repelled to said apertured electrode by said field, and varying the potential applied to said retarding electrode between a potential at which substantially all ions in the beam are repelled to said apertured electrode and a potential at which substantially only metastable fragment ions in the beam are so repelled.

Further according to the present invention a method of measuring the intensity of ions in a beam within a desired ion energy range comprises using an apertured electrode to admit the ion beam, a first retarding electrode located beyond the apertured electrode to apply a retarding electric field to ions passing through the aperture, a detector mounted on said first retarding electrode to detect secondary electrons emitted from said apertured electrode by ions repelled to said apertured electrode by said field, a second retarding electrode having an aperture and preceding said apertured electrode to apply a retarding field to ions approaching said second electrode, the potential applied to said second retarding electrode being smaller than the potential applied to said first retarding electrode and said potentials being selected to define between them the desired ion energy range.

DESCRIPTION OF THE DRAWINGS

To enable the nature of the present invention to be more readily understood, attention is directed, by way of example, to the accompanying drawings wherein.

Figure 1:
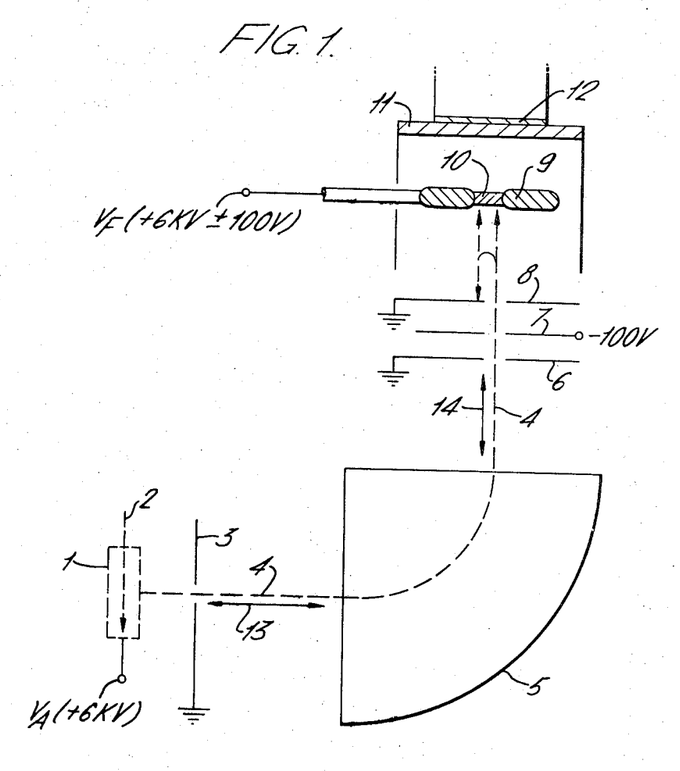
FIG. 1 is a simplified diagram of a mass spectrometer embodying one form of the invention.

Referring to FIG. 1, a mass spectrometer comprises a conventional ion source 1 which is maintained at a high positive potential $V_A$, in the present example +6 kv. An organic compound e.g. a complex hydrocarbon, introduced into the source in gaseous form is ionized by an electron beam 2 to produce positive ions which are extracted from the source and accelerated towards an electrode 3 having a slit and maintained at earth potential. The ion beam 4 emerging from the slit is deflected by an electromagnet 5 whose variable field is normal to the plane of the drawing, in a manner familiar to those skilled in the mass spectrometer art.

The beam emerging from the magnet 5 first passes through a slit in an earthed electrode 6 (constituting the aforementioned second apertured electrode), followed by a wide slit in an electrode 7 which is maintained at a potential of approximately −100 v. to suppress secondary electrons formed by any ions which strike electrode 6. The electron-free beam next passes through an earthed electrode 8 (constituting the aforementioned first apertured electrode) having a slit wider than that in electrode 6 to prevent the emission of secondary electrons by collision of the beam with its edges, beyond which is an annular first retarding electrode 9 whose center is occupied by a glasslike scintillator 10, e.g. a $CaF_2$ (Eu-loaded) crystal. Beyond electrode 9 is a vacuum-tight glass window 11, against the other side of which (i.e. outside the vacuum chamber of the mass spectrometer) is mounted the photocathode 12 of a photomultiplier tube. Electrode 6 forms the resolving slit of the spectrometer in this embodiment.

As mentioned in the introduction, the ion beam 4 approaching electrode 6 consists of parent ions, fragment ions and metastable fragment ions, these last having been largely formed during the passage of the beam between electrodes 3 and 6. The electrode 9 is maintained at a potential which is variable between a potential $V_F$ slightly positive to the accelerating potential $V_A$ of source 1, say +6.1 kv., and a potential slightly negative to the potential of source 1, say +5.9 kv.

When electrode 9 is at +6.1 kv. all the ions traversing the slit in electrode 8 are turned back towards earthed electrode 8, and strike its surface to produce secondary electrons which are accelerated into the glass scintillator 10. The resulting light is measured by the photomultiplier and is a measure of the parent, fragment and metastable fragment ion content of the beam.

When electrode 9 is at 5.9 kv., the parent and fragment ions approach scintillator 10 and strike it with sufficient energy to produce a signal in the photomultiplier. However the metastable fragment ions, whose energy is lower than that of those parent and fragment ions which did not fragment between electrodes 3 and 6, are repelled to electrode 8, where they produce secondary electrons which are accelerated to scintillator 10 as before. Hence the photomultiplier output in this instance is a measure of the metastable fragment ion intensity only.

To assist in discriminating between low-energy ions and secondary electrons, the surface of scintillator 10 which faces electrode 8 is coated with a thin layer of aluminum (not shown), of thickness a few $\mu g/cm.^2$, which is substantially opaque to the ions but transparent to the secondary electrons. It is desirable that electrodes 8 and 9 should be substantially parallel to one another as shown, in order to maintain the uniformity of the field between them.

It will be understood that the ±100 v. variation, ΔV, of electrode 9 relative to the source voltage, as described above, is not necessarily the most suitable variation for all measurements, this being a matter for experimental adjustment.

Various modifications of the described apparatus are possible. For example the electrode 9 and the scintillator 10 may be placed in contact with the inner surface of window 11.

The variable potential for electrode 9 is conveniently obtained from a potentiometer across a voltage source which also supplies the potential for source 1.

If the fragmentation process occurs between electrode 3 and magnet 5 (flight portion 13), it can be shown that the metastable fragment ion $M_2^+$ formed in the spontaneous fragmentation process $M_1^+ \rightarrow M_2^+$ (+ another fragment, usually neutral, which can be ignored for present purposes),
an apparent or pseudo mass M* where $$M^* = \frac{M_2^2}{M_1}$$

The fragmentation patterns that can be seen in the usual spectrum consist of various M* values, which can be nonintegral and usually form broad peaks. Usually a large metastable fragment ion M* is about 1 percent of the intensity of the most intense peak; moreover it can lie under a large peak (due to an ion formed in the initial ionization process) and be difficult to detect. The present invention allows such large peaks to be substantially eliminated, leaving those due to the metastable fragment ions.

The metastable fragment ions discussed above, i.e. those formed between electrode 3 and the magnet 5, have previously been detectable, albeit with difficulty. Metastable fragment ions are also formed during the passage of the beam through the magnet, but these are scattered over a wide mass range of the spectrum and cannot be analyzed. Spontaneous fragmentation also occurs between magnet 5 and the detector, but hitherto this has not been detectable because the fraction of metastable fragment ions $M_2^+$ so formed in the process $M_1^+ \rightarrow M_2^+$ (+another fragment, as above) is swamped by the much larger signal from $M_1^+$. The present invention enables the $M_1^+$ ions to be rejected and hence the $M_2^+$ ions to be detected.

Thus the present invention enables spontaneous fragmentation occurring over two portions of the flight to be examined, viz. between electrode 3 and magnet 5 (flight portion 13), and also between magnet 5 and electrode 6 (flight portion 14). Moreover, the measurements relating to portion 14 will indicate immediately whether $M_1^+$ is metastable, whereas when interpreting those relating to portion 13, it is necessary to manipulate numbers with a knowledge of organic chemistry to decide that M* really derives from the fragmentation of $M_1^+$ and not from some other ion $M_3^+$.

DESCRIPTION OF PREFERRED EMBODIMENT

Figure 2:
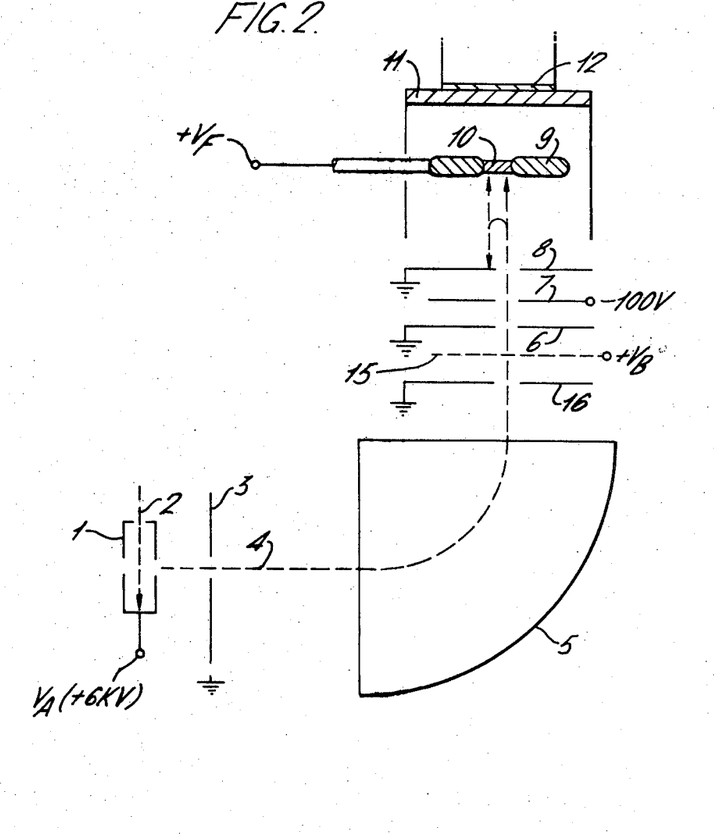
FIG. 2 is diagram similar to FIG. 1 illustrating another form of the invention.

FIG. 2 shows a form of the invention which can be used not only for the measurement of metastable spectra, but more generally to detect ions within a predetermined energy range. In FIG. 2, in which numerals 1—12 indicate the same features as in FIG. 1, there is provided a further apertured electrode 15 (constituting the aforementioned second retarding electrode), in the form of a grid; alternatively a slit may be used. Electrode 15 precedes apertured earthed electrode 6 and is preceded in turn by an apertured earthed electrode 16 (constituting the aforementioned third apertured electrode). Electrode 16 forms the resolving slit of the spectrometer in this embodiment.

In the arrangement described with reference to FIG. 1, the potential $V_F$ applied to electrode 9 was varied between values slightly above and slightly below the source potential $V_A$, depending on whether all ions, or only metastable fragment ions, were to be detected, respectively. In the arrangement of FIG. 2, the potential of electrode 9 is again shown as $+V_F$, and the source accelerating potential $V_A$ is again +6 kv. in this example. The electrode 15 has applied to it a potential $+V_B$ which is less than $+V_F$ and depends on the range of ions it is desired to select.

In operation, ions leaving the magnet 5 with energy less than $eV_B$ do not penetrate beyond electrode 15 because of the retarding field applied between electrodes 15 and 16. Those ions which do penetrate are restored to their initial energy by the accelerating field existing between electrode 15 and electrode 6. Of these ions, those with energies less than $eV_F$ are repelled to electrode 8 where they produce secondary electrons which are detected by scintillator 10 in the manner described with reference to FIG. 1. Ions with energy greater than $eV_F$ strike scintillator 10, but with insufficient energy to penetrate the thin layer of aluminum (not shown) which covers the scintillator. This layer is substantially opaque to ions up to quite high energies (several kev.), but transparent to the secondary electrons, as already described. Thus variation of $+V_F$ and $+V_B$ enables one to measure the abundance of ions in an energy band of width $eV_F - eV_B$ over a range of energies up to the maximum determined by the source potential.

The arrangement of FIG. 2 can be applied to spark-source mass spectrometers or sputtering-ion source mass spectrometers, to replace the electrostatic analyzers normally used with these instruments. It can also be used in other than mass spectrometer applications, e.g. to examine the energies of ions from a laser-produced plasma.

Figure 3:
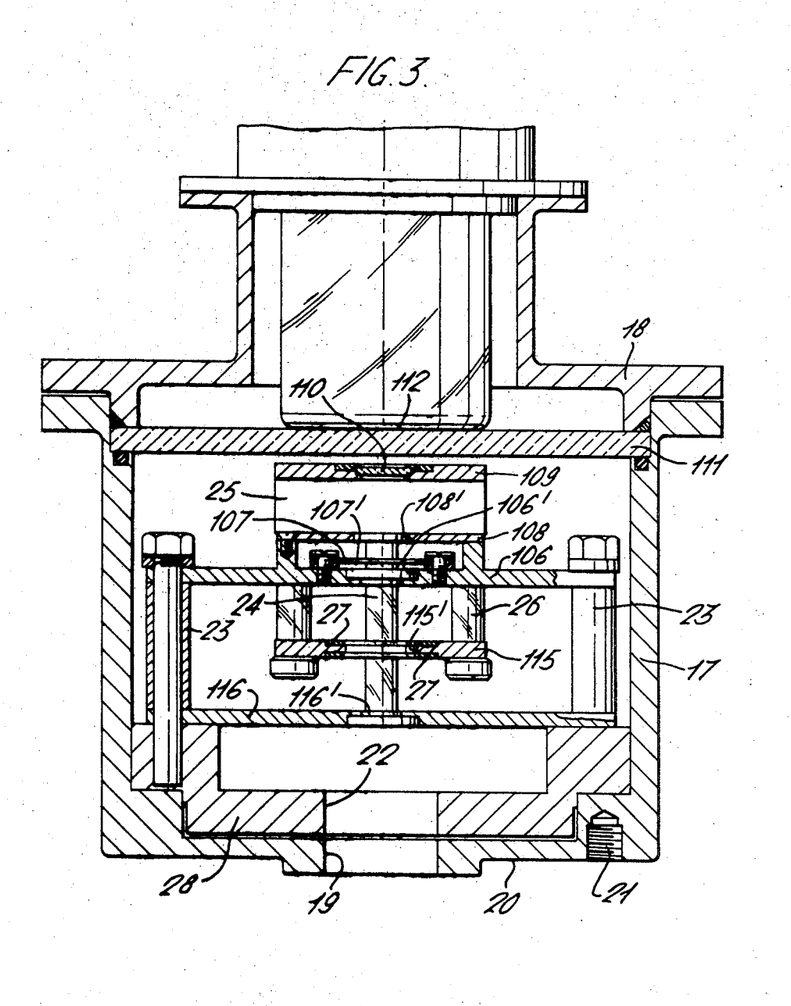
FIG. 3 is a sectional elevation of an ion beam intensity measuring apparatus of the kind illustrated in FIG. 2.

In FIG. 3 a stainless-steel body 17 is closed at one end by a flange 18. Between body and flange is located a glass plate 111, corresponding to window 11 in FIG. 2, an O-ring vacuum seal being provided between plate 111 and body 17 as shown. The photocathode 112 of a photomultiplier tube is mounted against the outer surface of plate 111. At the other end of the body is a circular aperture 19 for admitting the ion beam from the analyzing magnet of the mass spectrometer. Face 20 of the body is adapted to be mounted in a vacuum-tight manner against the vacuum chamber of the spectrometer, using screwed holes 21.

A locating block 28 is bolted to the inside of body 17 and has a circular aperture 22 in register with aperture 19. Secured to the recessed upper surface of block 28 is a circular plate 116 having a central knife-edge slit 116' which is three-eighths inch long and 10 thou wide (9.5×0.25 mm.). Plate 116 corresponds to earthed electrode 16 in FIG. 2.

Mounted on three steel pillars 23 is a rectangular plate 106 having a knife-edge slit 106' of the same dimensions as slit 116'. Plate 106 corresponds to electrode 6 in FIG. 2. Secured to a ring-shaped projection on plate 106 is a circular plate 108 having a knife-edge slit 108' which is one-half inch long and 30 thou wide (12.7×0.75 mm.). Plate 108 corresponds to electrode 8 in FIG. 2.

Between plates 106 and 108, and mounted on plate 106 by means of two insulating bushes, is a circular plate 107 having a slit 107' which is five-eighths inch long and 0.1 inch wide (15.9×2.54 mm.). Plate 107 corresponds to electrode 7 in FIG. 2.

Mounted on three insulating glass pillars 24 (of which only the rearmost is seen in this section) are two steel blocks 25 (of which only the rearmost is seen) carrying a rectangular plate 109. Plate 109 has a central aperture of three-eighths inch diameter (9.5 mm.) in which is mounted a $CaF_2$ (Eu) scintillator 110, these items corresponding to electrode 9 inch scintillator 11 respectively in FIG. 2.

Extending downwards in the drawing from blocks 25 are three insulating glass pillars 26 (of which only the two rearmost are seen) supporting a rectangular plate 115 having a hole 115' which is five-eighths inch in diameter (15.9 mm.) and within which two parallel fine wire mesh grids (not shown) are held by rings 27. The grids have 375 squares per inch (14.75 per mm.). Plate 115 corresponds to electrode 15 in FIG. 2.

The spacing between the electrodes can be seen from the drawing, which is approximately to scale, the internal diameter of body 17 being 4½ inches (11.4 cm.). All the plates are of stainless steel.

Electrical connections to plates 107, 109 and 115 are made by wires (not shown) taken to lead-through connections (not shown) sealed into the walls of the body 17. Plates 116, 106 and 108 are earthed to body 17 by their respective modes of mounting.

In FIG. 3 slit 116 forms the resolving slit of the mass spectrometer and the ion beam is arranged to focus thereat. If desired, an alternative resolving slit, e.g. of adjustable width, can precede plate 116. Such an alternative slit (not shown) can be mounted in the recess in locating block 28, and the ion beam focus altered accordingly.

FIGS. 4—7 show results obtained with the form of apparatus shown in FIGS. 2 and 3. The behavior of three types of positive ion in such apparatus may first be considered with reference to FIG. 2.

Type I—Stable ions: These pass through electrode 8, with kinetic energy $eV_A$ volts where $V_A$ is the potential drop between the ion source 1 and electrode 3. At some point between electrodes 8 and 9 where the potential is $V_1$ the kinetic energy of these ions is $e(V_A-V_1)$. The ions will be turned back to electrode 8 if the kinetic energy is zero, i.e., at a point between electrodes 8 and 9 of potential $V_1$ where $V_1 = V_A$. In other words to record a "normal" mass spectrum the potential $V_F$ of the scintillator must be at least equal to $V_A$.

Type II—Metastable ions fragmenting before electrode 8. If the decomposition $$M_1^- \rightarrow M_2^- + (M_1 - M_2)$$

takes place without release of energy, then the metastable fragment ions $M_2^+$ have kinetic energy $(M_2/M_1) \cdot b \cdot eV_A$ as they pass through electrode 8. Thus these fragment ions are turned back at a discrete value of potential $V_1$ in the region of electrode 9 where $$V_1 = \frac{M_2}{M_1} \cdot V_A.$$

If $V_F$ is less than $V_A$ but greater than $(M_2/M_1)V_A$, then normal ions are rejected and only fragment ions from metastable fragmentations with energies less than $M_2/M_1 \cdot b \cdot eV_A$ are recorded as described above.

Type III—Metastable ions fragmenting between electrodes 8 and 9. Assume that the parent ion $M_1^+$ passes through electrode 8 with kinetic energy $eV_A$. Its kinetic energy at a point of potential $V_1$ nearer electrode 9 is thus $e(V_A-V_1)$. Now suppose $M_1^+$ fragments to $M_2^+$ plus a neutral fragment. At the instant of its formation the kinetic energy of $M_2^+$ is $M_2/M_1 \cdot b \cdot e(V_A-B1)$. At a point $V_2$ of higher potential, the kinetic energy will be $M_2/M_1 \cdot b \cdot e(V_A-V_1)-e(V_2-V_1)$ and the ion will be turned back to electrode 8 if this is equal to zero, i.e. if $$V_2 = V_1 \cdot \left(1 - \frac{M_2}{M_1}\right) + \frac{M_2}{M_1} \cdot V_A.$$

In other words these fragment ions are not turned back and thus recorded at a discrete value of potential, but may have energies ranging from $M_2/M_1 \cdot b \cdot eV_A$ up to $eV_A$ depending on the potential $V_1$ at the point of their formation.

The results shown in FIGS. 4—7 were obtained with a single-stage 12-inch radius 90° sector mass spectrometer. This instrument had a conventional Nier-type electron-impact ion-source.

Figure 4:
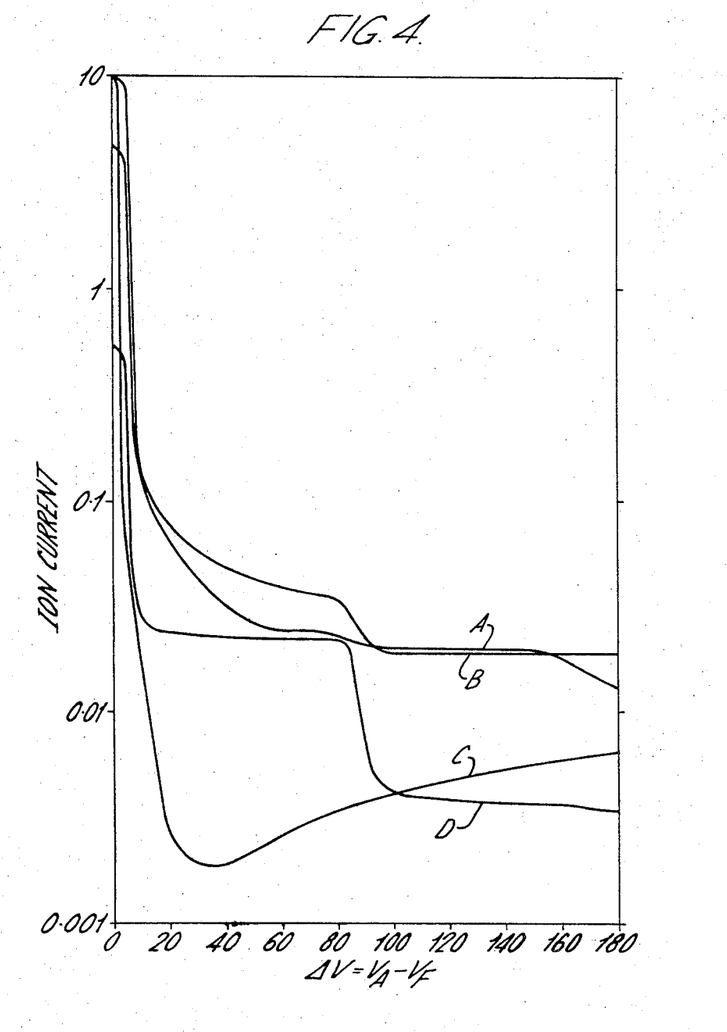
FIG. 4 shows graphs of log (ion current) against first retarding electrode voltage for various types of ions, with first retarding electrode voltage ($V_F$) = accelerating voltage ($V_A$) $-\Delta V$.

FIG. 4 illustrates the effect of varying $V_F$ on the intensities of the three types of ion beams described above. Curve C is of mass 40 in the spectrum of argon (i.e. a stable ion of type I as described above). With $V_F=V_A$ (in this case 4.5 kv.) all ions entering the measuring apparatus are turned back to electrode 8 and thus recorded. As $V_F$ is reduced, the ions begin to strike the aluminum foil and thus the recorded ion current drops. At $V_F=(V_A-30)$ V, the ion current is reduced by a factor of 6000. This represents the maximum suppression of normal ions. As $V_F$ is further reduced a continuous rise in the measured ion current is observed. This is probably due to optical effects resulting from pinholes in the aluminum coating in the scintillator 10 as ions of increasing energy impinge on the thin metal coating. Curve D was obtained by adjusting the magnet 5 to focus (m/e) 54 of trans-2-butene at the resolving slit. This mass-to-charge ratio comprises in the main two parts. Firstly there are stable (type I) ions of mass 54 formed in the source ionization chamber and thus entering the scintillator region between electrodes 8 and 9 with source energy. A sharp cutoff in the detection of these ions is again recorded when $V_F \approx (V_A -20)$ V. A second part of (m/e) 54 comprises ions of mass 55 formed by metastable fragmentation of mass 56 in flight portion 13 of FIG. 1. These ions have energy $55/56 \cdot eV_A$ and appear in the spectrum at (m/e) 54.01. They pass through electrode 8 with energy $55/56 \cdot eV_A$ and are thus detected so long as $V_F$ is greater than $55/56 \cdot V_A$. When $V_F$ is reduced below this value a sharp cutoff again occurs since the ions all have the same energy when they enter the scintillator region. The parent ion, (m/e) 56, of trans-2-butene produces all three types at the measuring apparatus as shown by curve A of FIG. 4. Ions not decomposing before or in the apparatus and having energy $eV_A$ are again sharply cutoff when $V_F<V_A$. Fragment ions $M_2$ formed between electrodes 8 and 9 (type III as described above) have energies ranging between $M_2/56 \cdot V_A$ and $eV_A$ and show a gradual cutoff as $V_F$ is decreased from $V_A$ to $(V_A-M_2/56 \cdot V_A)$. The sharp cutoff at $(V_A-80)$ V is due to abrupt nonrecording of ions of mass 55 formed by the transition 56 $^+\rightarrow$ 55 $^+$in flight portion 14 of FIG. 1. These enter the scintillator region between electrodes 8 and 9 with a discrete energy $55/56 \cdot eV_A$ (equal in this particular case to $(V_A-80)$ eV. Similar arguments apply to curve B which is of (m/e) 55 in trans-2-butene.

Figure 5:
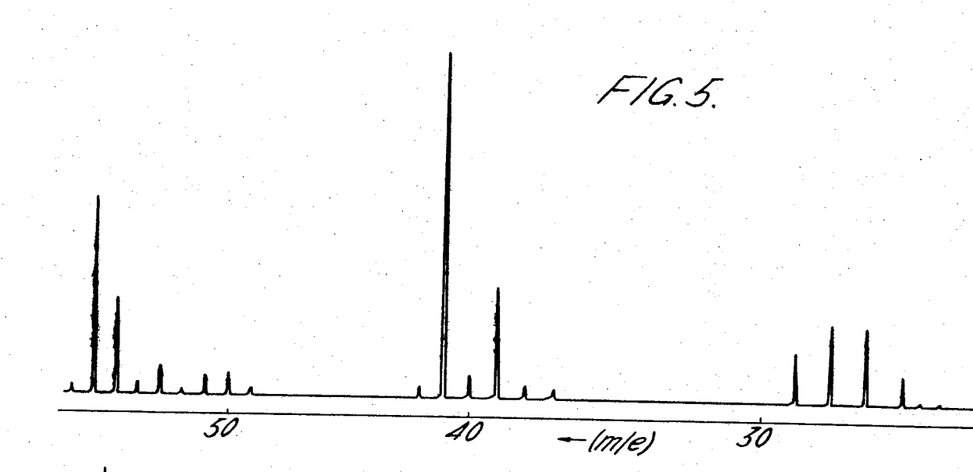
FIG. 5 shows a "normal" spectrum of trans-2-butene with $V_F = V_A + \Delta V$.

FIG. 5 is a reproduction of the mass spectrum of trans-2-butene scanned from (m/e) 20 to (m/e) 58 by variation of the field of magnet 5. $V_A$ was 8 kv. and $V_F$ was 20 volts higher, i.e. sufficient to turn back all ions in the spectrum to electrode 8. The spectrum was recorded at a single gain-setting on a pen recorder. Under such conditions the intensity of pseudo-mass peaks was too low for detection. Now the spectrum was rescanned at 100 times greater sensitivity with $V_F=(V_A-90)V$ and the results of FIG. 6 were obtained. Ions of energy $eV_A$ are now "buried" in the aluminum coating and are not recorded. All fragment ions formed in metastable fragmentations occurring between electrodes 3 and 16 are detected. Those formed in flight portion 13 produce the well-known broad peaks which are here referred to as pseudo-mass peaks. The absence of the normal ion beams allowed a much greater measurement sensitivity to be used, and in the mass range scanned for FIG. 6 many more pseudo-mass peaks were observed than had previously been reported.

Figure 6:
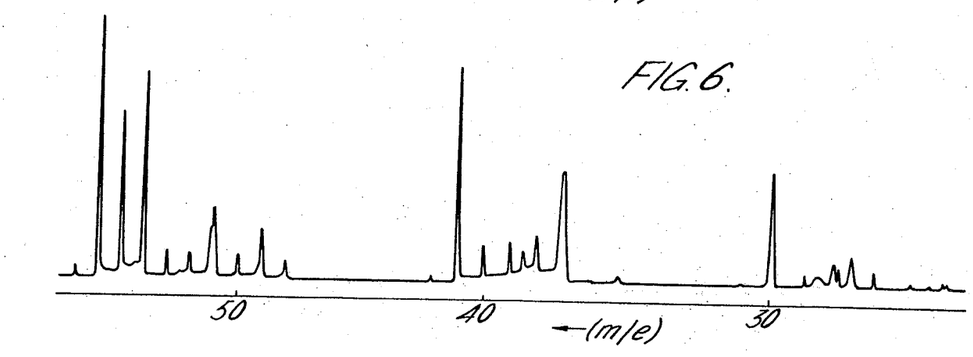
FIG. 6 shows the spectrum of metastable fragmentations of trans-2-butene with $V_F = V_A \Delta V$, where $\Delta V \approx V_A/90$.
Figure 7:
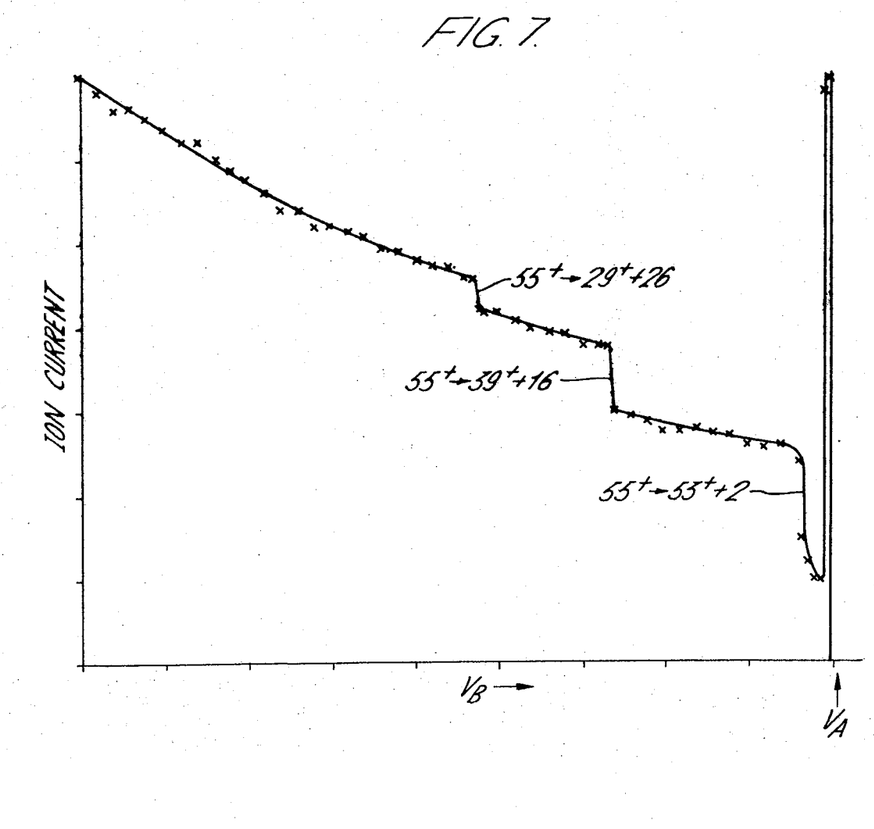
FIG. 7 is a graph of ion current versus second retarding electrode voltage for ($m/e$)55 in trans-2-butene.

In addition to pseudo-mass peaks, FIG. 6 shows sharp peaks occurring at integral $(m/e)$ values. These are due to the products of metastable fragmentation occurring after magnetic mass dispersion of the metastable ion (i.e. occurring in flight portion 14 of FIG. 1) and are measured simultaneously at the mass-to-charge ratio of this ion. Such fragments are not amenable to detection by conventional methods owing to the preponderance of normal ions at the same $(m/e)$ value. By scanning the retarding voltage $V_b$ applied to electrode 15, the masses of these metastable fragment ions can be determined. FIG. 7 shows the results obtained for these metastable fragment ions occurring at mass 55 in the trans-2-butene spectrum. $V_F$ was set so that only ions resulting from fragmentation were detected. $V_B$ was increased from earth up to $V_A$. Steps on the $V_B$ versus ion current curve correspond to rejection of ions of energy less than $eV_B$. If the mass focused at the resolving slit 16 is $M_1$ then the mass of the rejected fragment $M_2$ is given by $$M_2 = M_1 \cdot \frac{V_B}{V_A}$$

The three steps shown in FIG. 7 correspond to the fragmentations $C_4H_7 \rightarrow C_2H_5^+ + C_2H_2$
$C_4H_7 \rightarrow C_3H_3^+ + CH_4$
$C_4H_7 \rightarrow C_4H_5^+ + H_2$ and the final cutoff at $V_B=V_A$ corresponds to rejection of the residual "normal" ions of mass 55. Pseudo-mass peaks at $(m/e) =15.3, 27.7,$ and $51.07$ confirm the three transitions described. The large increase in ion current just before the final cutoff is probably due to defocusing of the ion beam on to the edges of the slit in electrode 8, with consequence release of secondary electrons. In other words a very large signal due to the normal ion beam as well as that of the less energetic fragments is being recorded in spite of $V_F$ being less than $V_A$. By omitting electrode 8 and using electrode 7 as the source of "desired" secondary electrons the "spike" at the end of the $V_B$ versus ion-current curves can be removed. However the performance of the so-modified apparatus is much inferior to that hereinbefore described in respect of the reduction factor for normal ion beams, viz about 2000 compared with 6000 for the argon peak at $(m/e)$ 40 as shown in FIG. 4, so this modified form of the apparatus is not preferred.

Although described with reference to its use with a single-stage mass spectrometer, the present invention is also applicable to two-stage instruments, i.e. instruments in which the magnetic stage is preceded by an electrostatic stage, for example using Nier-Johnson geometry.

We claim:

1. Ion beam intensity measuring apparatus suitable for use with a mass spectrometer comprising a first apertured electrode for admitting the ion beam and having a surface capable of emitting secondary electrons, a first retarding electrode located beyond said first apertured electrode to apply a retarding electric field to ions passing through the aperture, a detector for detecting secondary electrons emitted from said first apertured electrode by ions repelled to said first apertured electrode by said field, and a connection for applying a variable potential to said first retarding electrode.

2. Apparatus as claimed in claim 1 wherein said secondary electron detector is mounted on said first retarding electrode facing said first apertured electrode.

3. Apparatus as claimed in claim 2 wherein the surface of said secondary electron detector facing said first apertured electrode includes a coating which is substantially opaque to said ions but substantially transparent to said secondary electrons.

4. Apparatus as claimed in claim 3 wherein said coating is a metallic layer.

5. Apparatus as claimed in claim 3 wherein said detector is a translucent scintillator and forms the central portion of said first retarding electrode.

6. Apparatus as claimed in claim 5 wherein the photocathode of a photomultiplier tube is located beyond said first retarding electrode opposite that surface of said scintillator which faces away from said first apertured electrode.

7. Apparatus as claimed in claim 2 wherein said first apertured electrode is preceded by a second retarding electrode having an aperture and having a connection for applying thereto a variable potential less than the potential applied to said first retarding electrode.

8. Apparatus as claimed in claim 7 wherein said second retarding electrode includes a grid.

9. Apparatus as claimed in claim 2 wherein said first apertured electrode is preceded by a second apertured electrode arranged to be held at the same potential as said first apertured electrode and wherein an apertured electron-suppression electrode is located between said first and second apertured electrodes.

10. Apparatus as claimed in claim 7 wherein said first apertured electrode is preceded by a second apertured electrode arranged to be held at the same potential as said first apertured electrode, wherein an apertured electron-suppression electrode is located between said first and second apertured electrodes, wherein said second retarding electrode precedes said second apertured electrode, and wherein a third apertured electrode precedes said second retarding electrode and is arranged to be held at the same potential as said first and second apertured electrodes.

11. Apparatus as claimed in claim 2 wherein said first retarding electrode and said first apertured electrode are substantially parallel to one another.

12. A method of measuring a metastable fragment ion spectrum with a mass spectrometer comprising admitting the ion beam through an apertured electrode having a surface capable of emitting secondary electrons, applying a potential to a retarding electrode located beyond the apertured electrode to repel ions back to said apertured electrode and thereby produce secondary electrons thereat, allowing said secondary electrons to impinge on a detector mounted on said retarding electrode, and varying the potential applied to said retarding electrode between a potential at which substantially all ions in the beam are repelled to said apertured electrode and a potential at which substantially only metastable fragment ions in the beam are so repelled.

13. A method of measuring the intensity of ions in a beam within a desired energy range comprising causing the ion beam to approach an apertured retarding electrode, applying a potential to said apertured retarding electrode to repel ions below a selected energy approaching said apertured retarding electrode, admitting those ions which traverse said apertured retarding electrode through a further apertured electrode having a surface capable of emitting secondary electrons, applying a potential to a further retarding electrode located beyond said apertured electrode to repel ions below a further selected energy back to said apertured electrode and thereby produce secondary electrons thereat, allowing said secondary electrons to impinge on a detector mounted on said further retarding electrode, the potential applied to said further retarding electrode being greater than that applied to the apertured retarding electrode and said potentials being selected to define between them the desired ion energy range.